US008756504B2

(12) United States Patent
Fujieda (10) Patent No.: US 8,756,504 B2
(45) Date of Patent: Jun. 17, 2014

(54) COMMAND TRANSMITTING APPARATUS

(75) Inventor: Akifumi Fujieda, Neyagawa (JP)

(73) Assignee: Onkyo Corporation, Osaka (JP)

( * ) Notice: Subject to any disclaimer, the term of this patent is extended or adjusted under 35 U.S.C. 154(b) by 1698 days.

(21) Appl. No.: 12/017,093

(22) Filed: Jan. 21, 2008

(65) Prior Publication Data

US 2008/0300701 A1 Dec. 4, 2008

(30) Foreign Application Priority Data

Jun. 1, 2007 (JP) ................................ 2007-147238

(51) Int. Cl.
*G06F 3/00* (2006.01)
*G06F 1/10* (2006.01)
*G06F 1/16* (2006.01)
*G06F 3/01* (2006.01)
*G06F 3/02* (2006.01)

(52) U.S. Cl.
CPC ............... *G06F 1/10* (2013.01); *G06F 1/1607* (2013.01); *G06F 3/00* (2013.01); *G06F 3/01* (2013.01); *G06F 3/02* (2013.01)
USPC ............................ 715/716; 715/810; 715/764

(58) Field of Classification Search
CPC ........... G06F 1/10; G06F 1/1607; G06F 3/00; G06F 3/01; G06F 3/02
USPC ......................................... 715/716, 810, 764
See application file for complete search history.

(56) References Cited

U.S. PATENT DOCUMENTS

| 7,046,230 | B2 * | 5/2006 | Zadesky et al. ............... 345/156 |
| 7,634,263 | B2 * | 12/2009 | Louch et al. .................. 455/420 |
| 7,667,124 | B2 * | 2/2010 | Robbin et al. .................. 84/615 |
| 2003/0095096 | A1 * | 5/2003 | Robbin et al. ................. 345/156 |

(Continued)

FOREIGN PATENT DOCUMENTS

| JP | 2004-234794 | 8/2004 |
| JP | 2005-347820 | 12/2005 |

(Continued)

OTHER PUBLICATIONS

"iPod Features Guide". Copyright 2006, Apple Computers, Inc. pp. 1-72.*

*Primary Examiner* — Michael Roswell
(74) *Attorney, Agent, or Firm* — Renner, Otto, Boisselle & Sklar, LLP (57) ABSTRACT

A command transmitting apparatus includes: an input section having a first key and a second key; a mode setting section having a normal mode and a menu mode, shifting from the normal mode to the menu mode in response to an operation of the first key, and shifting from the menu mode to the normal mode after lapse of predetermined time which is the same as the predetermined time set in the content reproducing apparatus; a command transmitting section for transmitting the first command to the content reproducing apparatus in response to an operation on the first key; and a mode determining section for determining a mode set in the mode setting section when the second key is operated. When it is determined that the mode setting section is in the normal mode, the command transmitting section transmits a second command for controlling the normal mode of the content reproducing apparatus to the content reproducing apparatus. When it is determined that the mode setting section is in the menu mode, the command transmitting section transmits a third command for controlling the menu mode of the content reproducing apparatus to the content reproducing apparatus.

12 Claims, 5 Drawing Sheets

(56) References Cited

U.S. PATENT DOCUMENTS

| | | |
|---|---|---|
| 2004/0224638 A1* | 11/2004 | Fadell et al. .................. 455/66.1 |
| 2004/0247280 A1 | 12/2004 | Izawa |
| 2005/0265691 A1 | 12/2005 | Sato et al. |
| 2006/0200601 A1 | 9/2006 | Sugihara et al. |
| 2007/0139878 A1* | 6/2007 | Giffin et al. ................... 361/684 |
| 2007/0192458 A1 | 8/2007 | Sugihara |
| 2008/0065988 A1* | 3/2008 | Gupta et al. .................. 715/716 |

FOREIGN PATENT DOCUMENTS

| | | |
|---|---|---|
| JP | 2006-244607 | 9/2006 |
| JP | 2006-323910 | 11/2006 |
| JP | 3894226 | 3/2007 |

* cited by examiner

COMMAND TRANSMITTING APPARATUS

BACKGROUND OF THE INVENTION

1. Field of the Invention

The present invention relates to a command transmitting apparatus for transmitting a command which varies according to a mode to a content reproducing apparatus when the same key is operated by the user.

2. Description of the Related Art

In recent years, a portable player (content reproducing apparatus) having an HDD (hard disk drive) and a memory capable of storing a plurality of pieces of music piece data is being spread. A portable player is used to reproduce music piece data mainly outdoors. As an audio device used indoors, an amplifier such as a mini component system or radio-cassette player is used. Recently, an amplifier having a connector for connecting a portable player appears. In the case of using a portable player indoors, the portable player is connected to the connector of the amplifier disposed indoors, music piece data reproduced by the portable player is amplified by the amplifier, and sound is reproduced from a speaker connected to the amplifier.

The amplifier has the function of transmitting/receiving a command to/from the connected portable player, and can control the portable player by using a system remote controller of the amplifier (remote controller transmitter). For example, when a reproducing command for reproducing the portable player is input to the amplifier by operation of the remote controller of the user, the amplifier transmits the reproducing command to the portable player. The portable player starts reproducing of the music piece data in response to a reproducing command received from the amplifier.

Such a content reproducing system has the following problems. In the case of realizing all of the controls of the portable player by a system remote controller of the amplifier, the system remote controller of the amplifier has to be provided with a number of operation buttons. As a result, problems occur such that the size of the system remote controller becomes large, and the cost increases.

For example, the portable player has a hierarchical menu screen for performing various settings of the portable player and selecting desired music piece data. To operate the hierarchical menu screen by the system remote controller of the amplifier, a cursor-up key and a cursor-down key for vertically moving a cursor indicating an item presently selected in the hierarchical menu screen are necessary. However, the cursor-up key and the cursor-down key are low-use-frequency keys used only in the hierarchical menu screen of the portable player. Therefore, a technique is demanded, for operating the hierarchical menu screen of the portable player by the system remote controller without providing the system remote controller with such low-use-frequency keys.

Japanese Unexamined Patent Application Publication No. 2006-244607 and Japanese Patent No. 3,894,226 disclose a content reproducing system having a portable player 11, a charger 12, and an amplifier 13. The portable player 11 is connected to the charger 12 via connectors for sound and communication. The charger 12 is connected to the amplifier 13 via a cable for sound (and for communication as necessary). The charger 12 transmits an instruction to reproduce a music piece selected by the user to the portable player 11. The portable player 11 receives the reproducing instruction, reproduces the specified music piece, and transmits a sound signal to the charger 12. The charger 12 transmits the sound signal received from the portable player 11 to the amplifier 13. The amplifier 13 amplifies the sound signal received from the charger 12 and reproduces music via a not-shown speaker. In such a content reproducing system as well, problems similar to the above occur.

SUMMARY OF THE INVENTION

An object of the present invention is to provide a command transmitting apparatus capable of transmitting a command to control a menu screen of a content reproducing apparatus to the content reproducing apparatus without providing a key which is not frequently used for operating the menu screen of the content reproducing apparatus.

According to a preferred embodiment of the present invention, there is provided a command transmitting apparatus for transmitting a command to a content reproducing apparatus having a normal mode and a menu mode, shifting from the normal mode to the menu mode in response to a first command and, after lapse of predetermined time since the shift to the menu mode, shifting to the normal mode. The command transmitting apparatus includes: an input section having a first key and a second key; a mode setting section having a normal mode and a menu mode, shifting from the normal mode to the menu mode in response to an operation of the first key, and shifting from the menu mode to the normal mode after lapse of predetermined time which is the same as the predetermined time set in the content reproducing apparatus; a command transmitting section for transmitting the first command to the content reproducing apparatus in response to an operation on the first key; and a mode determining section for determining a mode set in the mode setting section when the second key is operated. When it is determined that the mode setting section is in the normal mode, the command transmitting section transmits a second command for controlling the normal mode of the content reproducing apparatus to the content reproducing apparatus. When it is determined that the mode setting section is in the menu mode, the command transmitting section transmits a third command for controlling the menu mode of the content reproducing apparatus to the content reproducing apparatus.

The command transmitting apparatus transmits the second command to the content reproducing apparatus when the second key is operated (for example, depressed) in the normal mode, and transmits the third command to the content reproducing apparatus when the second key is depressed in the menu mode. Therefore, since the common key is used for transmitting the second and third commands, the number of keys can be reduced. Moreover, when the first key is depressed, the mode setting section shifts to the menu mode, and the command transmitting section transmits the first command to the content reproducing apparatus. On reception of the first command, the content reproducing apparatus shifts to the menu mode. Therefore, the command transmitting apparatus and the content reproducing apparatus shift to the menu mode from the normal mode at the same timing. Further, the content reproducing apparatus and the command transmitting apparatus shift to the normal mode after lapse of the same predetermined time since the shift to the menu mode. That is, the command transmitting section and the content reproducing apparatus shift from the menu mode to the normal mode at the same timing. Therefore, the mode of the command transmitting apparatus and the mode of the content reproducing apparatus can be synchronized. As a result, a situation can be prevented such that the third command for controlling the menu mode is transmitted when the content reproducing apparatus is in the normal mode, and the second commend for controlling the normal mode is transmitted when the content reproducing apparatus is in the menu mode.

In a preferred embodiment, when the content reproducing apparatus executes a predetermined process in response to the first command or the third command in the menu mode, the predetermined time until shift to the normal mode is extended. When the first key or the second key is operated in the menu mode, the mode setting section extends the predetermined time until shift to the normal mode only by the same time as the extended time of the content reproducing apparatus.

When the content reproducing apparatus executes a predetermined process in response to the first command or the third command in the menu mode, the predetermined time until shift to the normal mode is extended. When the first key or the second key is operated in the menu mode, the command transmitting apparatus extends the predetermined time until shift to the normal mode only by the same time as the extended time of the content reproducing apparatus. Therefore, the mode of the command transmitting apparatus and the mode of the content reproducing apparatus can be synchronized.

In a preferred embodiment, the input section further includes a cancellation key. When the cancellation key is operated, the mode setting section shifts from the menu mode to the normal mode irrespective of whether the predetermined time has elapsed or not.

When the cancellation key is depressed, the command transmitting section shifts to the normal mode. Therefore, if the mode of the command transmitting apparatus and that of the content reproducing apparatus become different from each other, by depressing the cancellation key when the content reproducing apparatus is in the normal mode, the mode of the command transmitting apparatus and that of the content reproducing apparatus can be synchronized with each other.

In a preferred embodiment, when reproducing of content starts, the content reproducing apparatus shifts from the menu mode to the normal mode, and transmits reproducing start notification to the command transmitting apparatus. The command transmitting apparatus further includes a receiving section for receiving the reproducing start notification. When the reproducing start notification is received, the mode setting section shifts from the menu mode to the normal mode irrespective of whether the predetermined time has elapsed or not.

When reproducing of content starts in the menu mode, the content reproducing apparatus shifts to the normal mode. When the reproducing start notification is received, the command transmitting apparatus shifts to the normal mode. Therefore, the command transmitting apparatus and the content reproducing apparatus shift to the normal mode at the same timing, so that the mode of the command transmitting apparatus and that of the content reproducing apparatus can be synchronized.

In a preferred embodiment, the second key is a skip key, the second command is a skip command for changing content selected by the content reproducing apparatus to forward/backward content, and the third command is a cursor command for moving a cursor on a menu screen of the content reproducing apparatus.

DETAILED DESCRIPTION OF THE PREFERRED EMBODIMENTS

Figure 1:
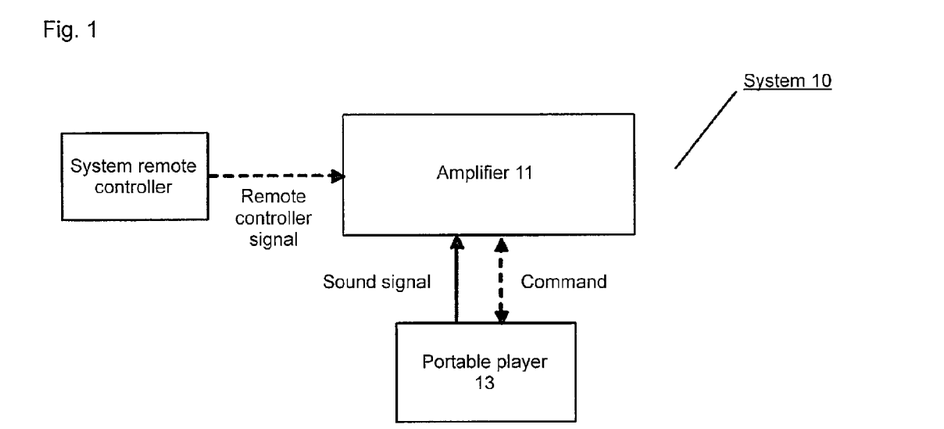
FIG. 1 is a block diagram showing a content reproducing system 10.
Figure 2:
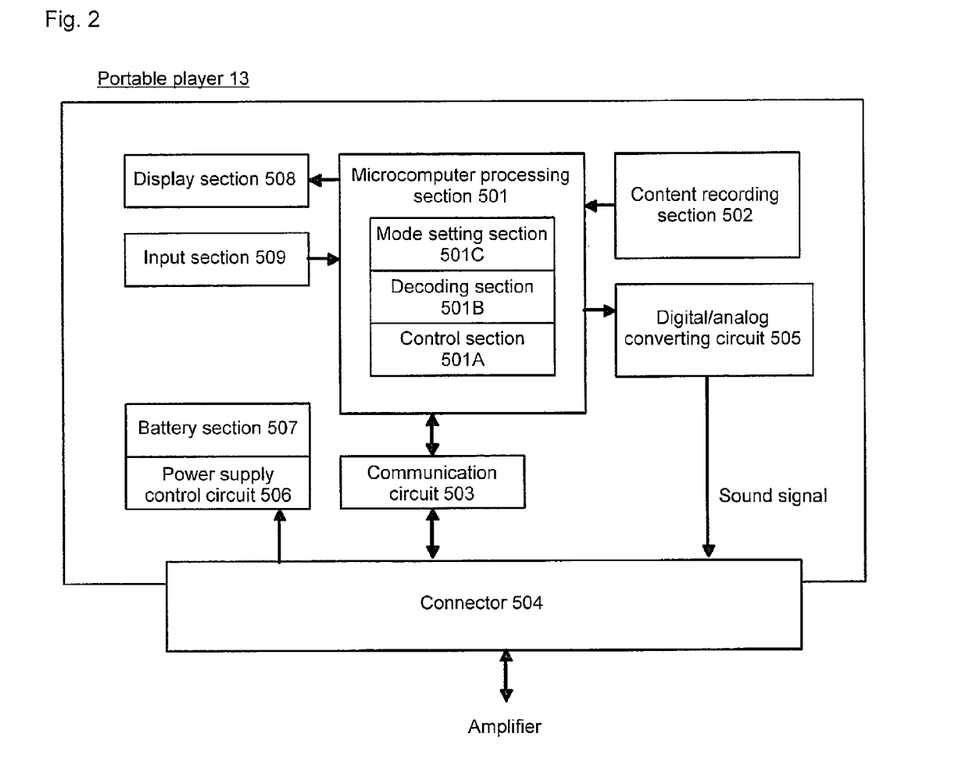
FIG. 2 is a schematic diagram showing the configuration of a portable player 13.
Figure 3:
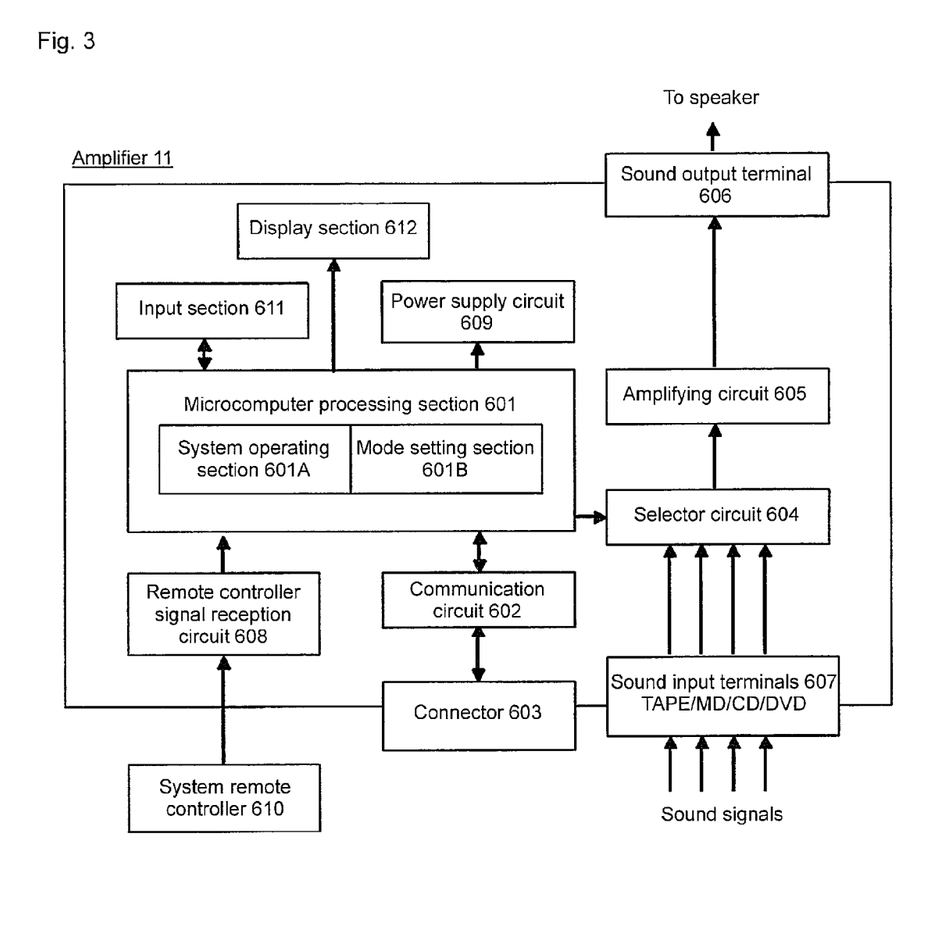
FIG. 3 is a schematic diagram showing the configuration of an amplifier 11.

Preferred embodiments of the present invention will be described concretely hereinbelow with reference to the drawings but the present invention is not limited to the embodiments. FIG. 1 is a schematic diagram showing a content reproducing system 10 having a command transmitting apparatus according to the preferred embodiment of the present invention. In the embodiment, content is a generic term of music (music piece), a video image, a still picture, and the like. The content may be analog or digital and may be in a compressed or non-compressed form (in the embodiment, the case of music piece data will be described as an example). The content reproducing system 10 has an amplifier (for example, a mini component system, a radio-cassette player, an AV amplifier, or the like, and the details are shown in FIG. 3) 11 having the function of a command transmitting apparatus, and a portable player 13 (the details are shown in FIG. 2). The amplifier 11 has a connector capable of connecting the portable player 13, and the portable player 13 is connected.

The portable player 13 has a content recording section (for example, HDD) capable of storing a plurality of pieces of music piece data, plays back music piece data, and transmits a sound signal to the amplifier 11. The amplifier 11 amplifies the sound signal received from the portable player 13 and outputs the amplified signal to a not-shown speaker. The amplifier 11 is provided with a system remote controller (remote control transmitter), and executes a predetermined operation in accordance with a command (instruction) received from the system remote controller.

As will be described in detail later, the portable player 13 and the amplifier 11 have a normal mode, a hierarchical menu mode, and a reproducing menu mode. The modes of the portable player 13 and the amplifier 11 are synchronized. The system remote controller of the amplifier 11 is provided with a skip key (second key). When the skip command (second command) is received from the system remote controller by depression of the skip key, if the present mode is the normal mode, the amplifier 11 transmits the skip command to the portable player 13. If the present mode is the hierarchical menu mode or the reproducing menu mode, the amplifier 11 transmits a cursor command (third command) to the portable player 13. When the skip command is received in the normal mode, the portable player 13 executes a process of skipping selected music piece data. When the cursor command is received in the hierarchical menu mode or reproducing menu mode, the portable player 13 executes a cursor process. The portable player 13 transmits a command to notify of an operation state of itself (for example, a reproducing start notification) or the like to the amplifier 11. In response to the reproducing start notification received from the portable player 13, the amplifier 11 executes a predetermined operation (shift to the normal mode).

Configuration of Portable Player

FIG. 2 is a schematic diagram showing the configuration of the portable player 13. The portable player 13 has a microcomputer processing section 501, a content recording section 502, a communication circuit 503, a connector 504, a digital/analog converting circuit 505, a power supply control circuit 506, a battery section 507, a display section 508, and an input section 509. The microcomputer processing section 501 includes a control section 501A, a decoding section 501B, and a mode setting section 501C.

The control section 501A controls the components of the portable player 13 on the basis of a command received from the amplifier 11 via the connector 504 and the communication circuit 503. The control section 501A also transmits a command to the amplifier 11 via the communication circuit 503 and the connector 504. The decoding section 501B decodes the music piece data from the content recording section (for example, HDD) 502 and gives the decoded data to the digital/analog converting circuit 505. The digital/analog converting circuit 505 converts the music piece data from the decoding section 501B to an analog sound signal, and outputs the sound signal to the amplifier 11 via the connector 504.

The mode setting section 501C has the normal mode, the hierarchical menu mode, and the reproducing menu mode as operating states of the portable player 13 (display modes of the display section 508), and sets any of the modes as a present mode. Setting of a mode denotes storage of the present mode into a memory. When the menu command is received in the normal mode (or the reproducing menu mode), the mode setting section 501C shifts from the normal mode (or the reproducing menu mode) to the hierarchical menu mode. When a selection command is received in the normal mode, the mode setting section 501C shifts from the normal mode to the reproducing menu mode. The mode setting section 501C counts predetermined time with a timer. After lapse of predetermined time since the timer counting has started, the mode setting section 501C shifts from the hierarchical menu mode or the reproducing menu mode to the normal mode.

Figure 4:
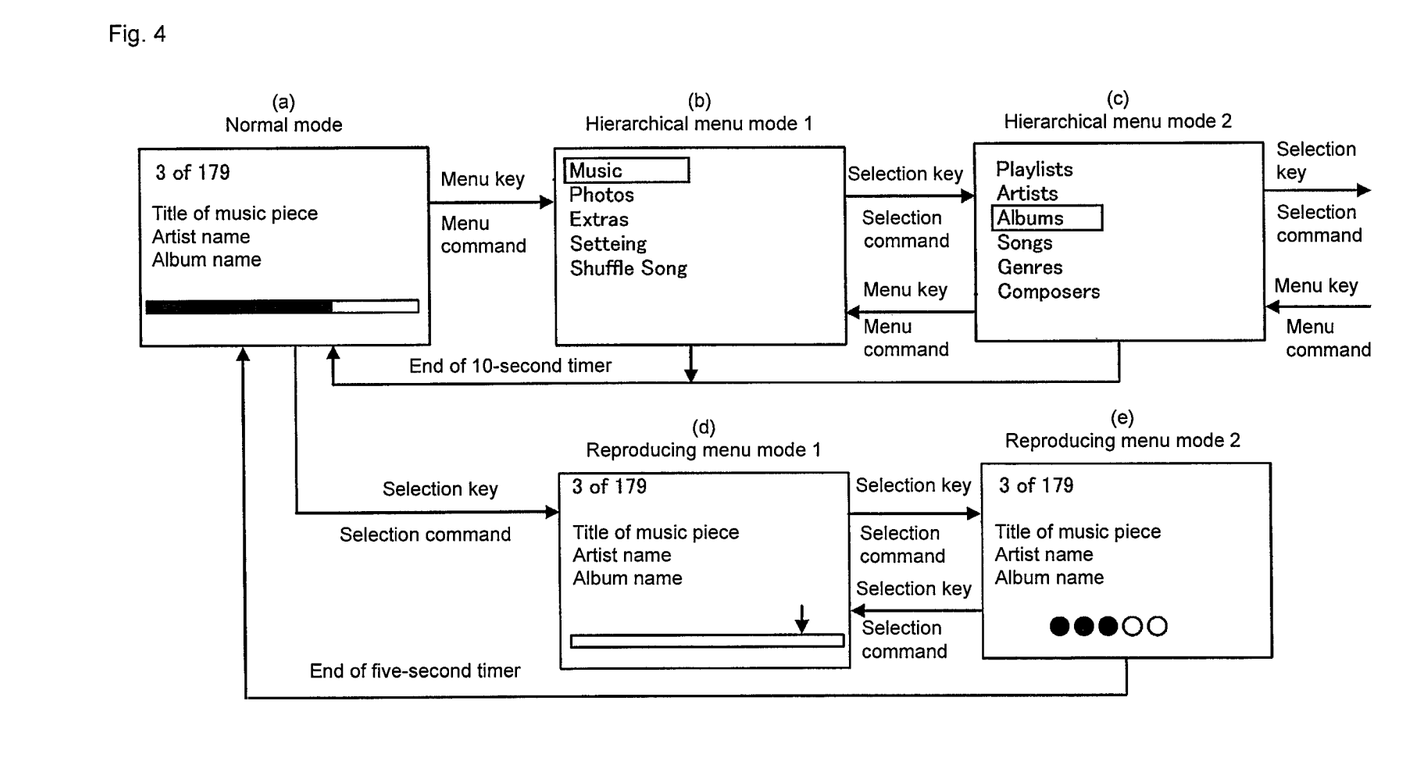
FIG. 4 is a schematic diagram showing transition of a mode of the portable player 13.
Figure 5:
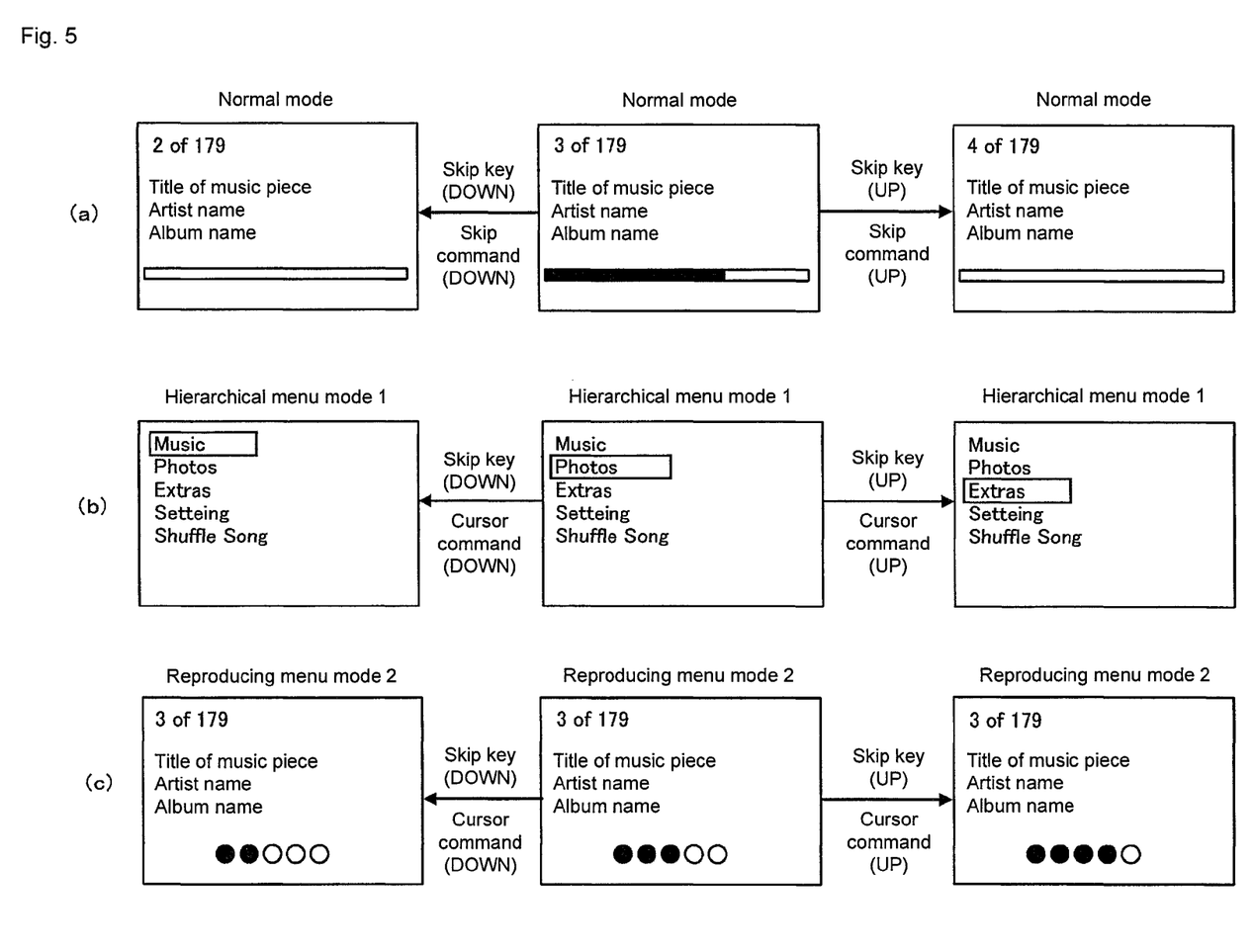
FIG. 5 is a schematic diagram showing processes executed in response to depression of a skip key in each of the modes of the portable player 13.

FIG. 4 is a diagram for explaining transition of modes of the portable player 13. FIG. 5 is a diagram showing transition of the display screen when the skip command or cursor command is received in the normal mode (a), the hierarchical menu mode (b), and the reproducing menu mode (c). In FIGS. 4 and 5, a depressed key in the system remote controller of the amplifier 11 is shown on the upper side of the arrow, and a command transmitted from the amplifier 11 to the portable player 13 in correspondence with the depressed key is shown on the lower side.

In the normal mode, as shown in FIG. 4 (a), the portable player 13 reproduces the selected music piece data (or stops reproduction) and displays content information (title of the music piece, artist name, album name, genre name, reproduction time, and the like) on the display section 508. For example, in FIG. 4 (a), the number of the music piece data selected (the third music piece in 179 music pieces), the title of the music piece, the artist name, the album name, and the present reproduction position in total reproduction time are displayed. In the normal mode, as shown in FIG. 5 (a), when the skip command (UP or DOWN) is received, selected music piece data is changed (skipped or cued) to forward/backward music piece data.

In the hierarchical menu modes, as shown in FIGS. 4 (b) and (c), without displaying content information of the selected music piece data, items for making various settings of the portable player 13 and items for selecting content are displayed in a hierarchical structure (tree structure) on the display section 508 so that the user executes an item. In the hierarchical menu mode, the cursor is displayed. As shown in FIG. 5 (b), when the cursor command (UP or DOWN) is received, the cursor is moved up or down so that a selected item can be changed.

When the menu command is received in the normal mode in FIG. 4 (a), the mode setting section 501C shifts to the hierarchical menu mode 1 in FIG. 4 (b) as the hierarchical menu in the highest layer. When the selection command is received in the hierarchical menu mode 1 in FIG. 4 (b), as shown in FIG. 4 (c), the mode shifts to a hierarchical menu mode 2 as a lower-order hierarchy of "Music" as the item in which the cursor is positioned in the hierarchical menu mode 1. When a menu command is received in the hierarchical menu mode 2, the mode returns to the hierarchical menu mode 1 in the upper layer. In the case where the menu command, the cursor command, or the selection command is not received for predetermined time (for example, 10 seconds) after the mode shifts to the hierarchical menu mode, the mode setting section 501C shifts from the hierarchical menu mode to the normal mode. Specifically, when the mode shifts to the hierarchical menu mode, the mode setting section 501C starts counting of a 10-second timer, after lapse of 10 seconds, finishes the counting of the timer, and shifts to the normal mode. When the menu command, the cursor command, or the selection command is received during the counting of the 10-second timer, the mode setting section 501C resets the counting of the timer, and starts counting of the 10-second timer from the beginning (that is, time of the hierarchical menu mode is extended).

In the reproducing menu mode, as shown in (d) and (e) in FIG. 4, the content information of selected music piece data is displayed in the upper part, and the various settings of the selected music piece data and the reproduction control screen of the selected music piece data are displayed in a lower part, so that the user executes the settings. In the reproducing menu mode 1 in FIG. 4 (d), the arrow for executing fast-forward play or fast-backward play is displayed at the bottom. When the cursor command (UP or DOWN) is received, fast-forward play or fast-backward play is executed. In the play menu mode 2 of FIG. 4 (e), a favorite rate of the selected music piece data is displayed at the bottom (in this case, the favorite rate is three in five stages). As shown in FIG. 5 (c), when the cursor command (UP or DOWN) is received, the value of the favorite rate increases (or decreases).

When the selection command is received in the normal mode of FIG. 4 (a), the mode setting section 501C shifts to the reproducing menu mode 1 in FIG. 4 (d). When the selection command is received in the reproducing menu mode 1 in FIG. 4 (d), the mode setting section 501C shifts to the reproducing menu mode 2 in FIG. 4 (e). When the selection command is received in the reproducing menu mode 2, the mode setting section 501C shifts to, for example, the reproducing menu mode 1. In the case where the menu command, the cursor command, or the selection command is not received for predetermined time (for example, five seconds) since the shift to the reproducing menu mode, the mode setting section 501C shifts from the reproducing menu mode to the normal mode. Specifically, when the mode shifts to the reproducing menu mode, the mode setting section 501C starts counting of a five-second timer, after lapse of five seconds, finishes the counting of the timer, and shifts to the normal mode. When the cursor command or the selection command is received during the counting of the five-second timer, the mode setting section 501C resets the five-second timer and starts counting of the five-second timer from the beginning (that is, time of the reproducing menu mode is extended). When the menu command is received during the counting of the five-second timer, the mode setting section 501C shifts to the hierarchical menu mode 1 in FIG. 4 (b) and starts the counting of the 10-second timer.

Referring again to FIG. 2, the power supply control circuit 506 gives power source voltage supplied from a not-shown charger to the battery section 507 via the connector 504, and supplies the power source voltage charged in the battery section 507 to the components in the portable player 13. The display section 508 includes a liquid crystal display or the like and displays the screen in each of the above-described modes.

Configuration of Amplifier

FIG. 3 is a schematic diagram showing the configuration of the amplifier 11. The amplifier 11 includes a microcomputer processing section 601, a communication circuit 602, a connector 603, a selector circuit 604, an amplifying circuit 605, a sound output terminal 606, a plurality of sound input terminals 607, a remote controller signal reception circuit 608, a power supply circuit 609, an input section 611, and a display section 612. The microcomputer processing section 601 includes a system operating section 601A and a mode setting section 601B.

The remote controller signal reception circuit 608 converts an infrared command received from a system remote controller 610 to a command of an electric signal and supplies the electric signal command to the microcomputer processing section 601. The system remote controller 610 has, as keys for controlling the portable player 13, at least a menu key, a skip key (UP and DOWN), and a selection key.

The mode setting section 601B sets any of the normal mode, the hierarchical menu mode, and the reproducing menu mode in response to a command received from the remote controller signal reception circuit 608 (or the input section 611, which is the same in the following). Setting of a mode denotes storage of the present mode into a not-shown memory. At the same time as the portable player 13 shifts to any of the normal mode, the hierarchical menu mode, and the reproducing menu mode, the mode setting section 601B shifts to the same mode as that of the portable player 13. That is, the mode setting section 601B shifts to any of the modes under the same condition as that of the mode setting section 501C of the portable player 13.

Specifically, when the menu key of the system remote controller 610 is depressed, the mode setting section 601B shifts from the normal mode to the hierarchical menu mode. At the time of shift to the hierarchical menu mode, the mode setting section 601B starts counting of the 10-second timer, finishes the counting of the timer after lapse of 10 seconds since the counting starts, and shifts to the normal mode. When the menu key, the skip key, or the selection key in the system remote controller 610 is depressed during counting of the 10-second timer, the mode setting section 501C resets the timer counting and starts the counting of the 10-second timer from the beginning (that is, extends the time of the hierarchical menu mode).

Similarly, the mode setting section 601B shifts from the normal mode to the reproducing menu mode when the selection key in the system remote controller is depressed in the normal mode. In the case where the menu key, the skip key, or the selection key in the system remote controller 610 is not depressed for predetermined time (for example, five seconds) since the mode setting section 601B shifts to the reproducing menu mode, the mode setting section 601B shifts from the reproducing menu mode to the normal mode. That is, the mode setting section 601B starts the counting of the five-second timer at the time of shift to the reproducing menu mode and, after lapse of five seconds since the timer counting has started, finishes the counting of the timer, and shifts to the normal mode. When the skip key or the selection key in the system remote controller is received during counting of the five-second timer, the mode setting section 501C resets the five-second timer and starts the counting of the five-second timer from the beginning (that is, extends the time of the reproducing menu mode).

As described above, the mode setting section 601B makes the condition of the shift to the normal mode, the hierarchical menu mode, or the reproducing menu mode (for example, a condition that the predetermined time of shift from the hierarchical menu mode to the normal mode is set to 10 seconds) the same as that of the portable player 13, thereby synchronizing the mode of the portable player 13 with that of the amplifier 11.

On the basis of the mode set in the mode setting section 601B, the system operating section 601A transmits a command to the portable player 13, which varies according to a command from the remote controller signal reception circuit 608. That is, when the menu code or the selection code is received in response to depression of the menu key or the selection key of the system remote controller 610, the system operating section 601A transmits the menu code or the selection code to the portable player 13 without changing it to another code irrespective of the set mode.

On the other hand, when the skip key (UP or DOWN) in the system remote controller 610 is depressed and the skip code (UP or DOWN) is received, if the set mode is the normal mode, the system operating section 601A transmits the skip code (UP or DOWN) to the portable player 13 without changing it to another code. If the set mode is the hierarchical menu mode or the reproducing menu mode, the system operating section 601A changes (converts) the skip code (UP or DOWN) to the cursor code (UP or DOWN) and transmits the cursor code to the portable player 13.

The sound input terminals 607 can connect a plurality of content reproducing apparatuses such as a CD player and an MD player, and sound signals are input from the content reproducing apparatuses. The selector circuit 604 selects one sound signal to be supplied to the amplifying circuit 605 from the sound signals input from the sound input terminals 607 and the sound signal input from the portable player 13. The selected sound signal is amplified by the amplifying circuit 605, and the amplified sound signal is output as sound via the sound output terminal 606 and a not-shown speaker. The input section 611 includes a key for controlling the portable player 13 like the system remote controller 610 and has at least the menu key, the skip key (UP and DOWN), and the selection key. That is, in place of controlling the portable player 13 by operating the system remote controller, the portable player 13 can be controlled by operating the input section 611. The display section 612 displays information of the mode set by the mode setting section 601B.

Operation

Figure 6:
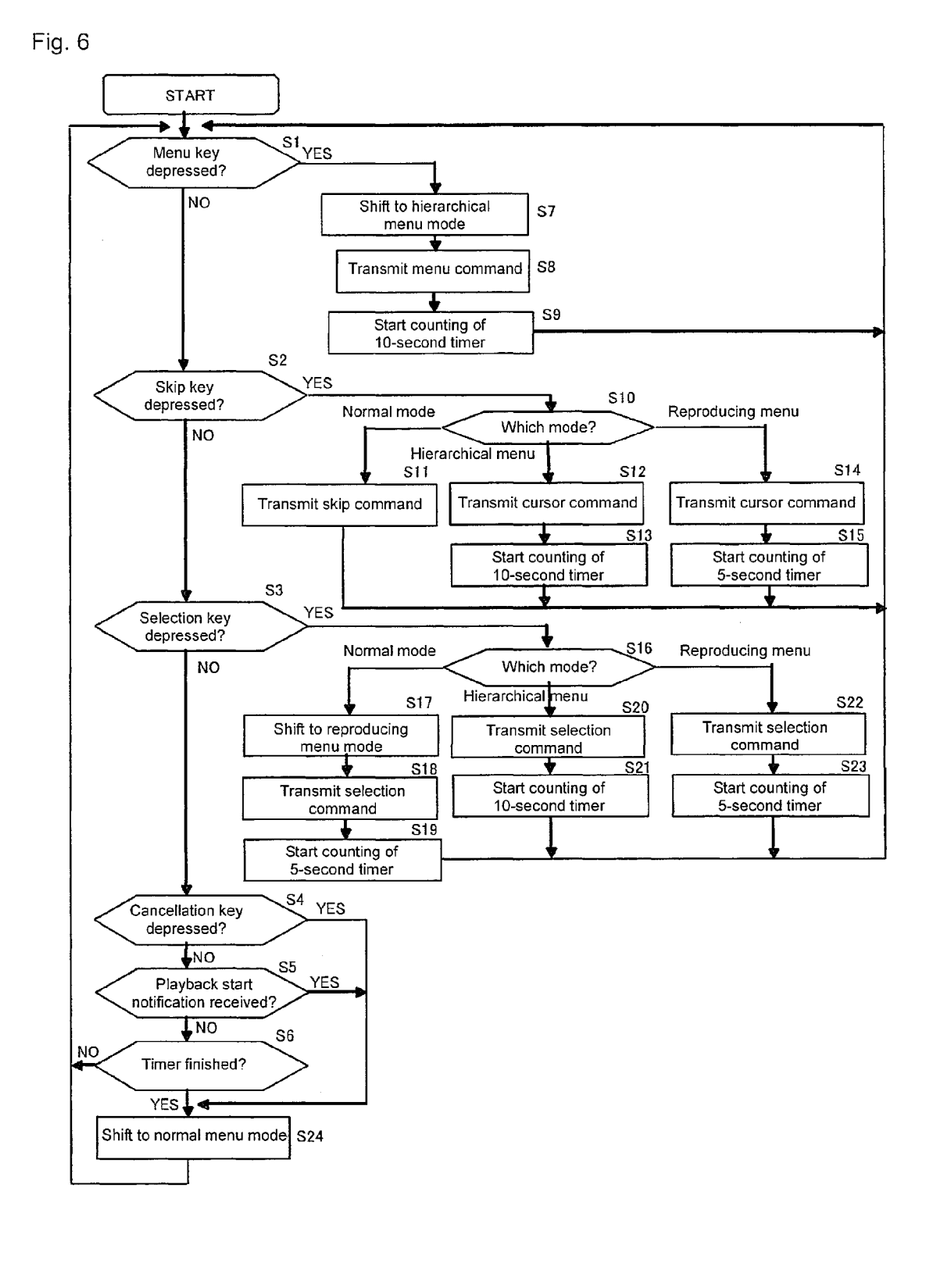
FIG. 6 is a schematic diagram showing processes executed by a microcomputer processing section 601 of the amplifier 11.

The operation of the content reproducing system 10 having the above-described configuration will be described with reference to FIG. 6. FIG. 6 is a flowchart showing processes of the microcomputer processing section 601 in the amplifier 11. In S1 to S3, the microcomputer processing section 601 always monitors depression of a key for controlling the portable player 13. First, the microcomputer processing section 601 determines whether the menu key is depressed or not (S1). When the menu key is depressed (YES in S1), the mode setting section 601B shifts from the normal mode to the hierarchy menu mode (S7) and displays that the present mode is the hierarchy menu mode on the display section 612. Subsequently, the microcomputer processing section 601 transmits the menu command to the portable player 13 (S8), and the mode setting section 601B starts counting of the 10-second timer (S9). On the other hand, when the menu command is received, the portable player 13 shifts to the hierarchical menu mode 1 as shown in FIG. 4 (b) and similarly starts counting of the 10-second timer.

Subsequently, the microcomputer processing section 601 determines whether the skip key is depressed or not (S2). When the skip key is depressed (YES in S2), the microcomputer processing section 601 determines the mode set in the mode setting section 601B in the amplifier 11 (S10). In the case of the normal mode ("normal mode" in S10), the microcomputer processing section 601 transmits the skip command (UP or DOWN) corresponding to the depressed skip key (UP or DOWN) to the portable player 13 (S11). On the other hand, when the skip command is received, the portable player 13 changes (skips) the selected music data to forward or backward music data as shown in FIG. 5 (a). Therefore, the user can change the selected music data to the forward/backward music data by depressing the skip key when the normal mode is displayed on the display section 612 of the amplifier 11.

In the case of the hierarchical menu mode (hierarchical menu S10), the microcomputer processing section 601 converts the skip command corresponding to the depressed skip key to the cursor command (that is, converts the skip UP command to the cursor UP command, or converts the skip DOWM command to the cursor DOWM command) and transmits the cursor command to the portable player 13 (S12). The mode setting section 601B resets the counting of the 10-second timer and starts counting of the 10-second timer from the beginning (S13). On the other hand, when the cursor command is received, the portable player 13 moves the cursor in the vertical direction in the hierarchical menu mode as shown in FIG. 5 (b). The mode setting section 501C of the portable player 13 also resets the counting of the 10-second timer and starts the counting of the 10-second timer from the beginning. Thus, the modes of the amplifier 11 and the portable player 13 are synchronized. Therefore, by depressing the skip key when the hierarchical menu mode is displayed on the display section 612 in the amplifier 11, the user can move the cursor of the hierarchical menu of the portable player 13 in the vertical direction.

In the case of the reproducing menu mode (the reproducing menu in S10), the microcomputer processing section 601 converts the skip command corresponding to the depressed skip key to the cursor key (that is, converts the skip UP command to the cursor UP command or converts the skip DOWN command to the cursor DOWN command), and transmits the cursor command to the portable player 13 (S14). The mode setting section 601B resets the counting of the 5-second timer and starts the counting of the 5-second timer from the beginning (S15). On the other hand, when the cursor command is received, the portable player 13 executes the operation corresponding to the cursor command in the reproducing menu mode as shown in FIG. 5 (c) (for example, the favorite rate is changed). The mode setting section 501C in the portable player 13 also resets the counting of the 5-second timer at the same timing and starts the counting of the 5-second timer from the beginning. Consequently, the modes of the amplifier 11 and the portable player 13 are synchronized. Therefore, the user can execute the operation of the reproducing menu of the portable player 13 by depressing the skip key while the reproducing menu mode is displayed on the display section 611 of the amplifier 11.

Subsequently, the microcomputer processing section 601 determines whether the selection key is depressed or not (S3). When the selection key is depressed (YES in S3), the microcomputer processing section 601 determines the mode set in the mode setting section 601B (S16). In the case where the mode is the normal mode ("normal mode" in S16), the mode setting section 601B shifts from the normal mode to the reproducing menu mode (S17) and displays the reproducing menu mode on the display section 612. Subsequently, the microcomputer processing section 601 transmits the selection command corresponding to the depressed selection key to the portable player 13 (S18). The mode setting section 601B starts the counting of the 5-second timer (S19). On the other hand, when the selection command is received, as shown in FIG. 4, the portable player 13 shifts from the normal mode to the reproducing menu mode, and similarly, starts the counting of the 5-second timer. As a result, the modes of the portable player 13 and the amplifier 11 can be simultaneously shifted to the reproducing menu mode.

When the mode is the hierarchical menu mode (hierarchical menu in S16), the microcomputer processing section 601 transmits the selection command corresponding to the depressed selection key to the portable player 13 (S20). The mode setting section 601B resets the counting of the 10-second timer and starts the counting of the 10-second timer from the beginning (S21). On the other hand, when the selection command is received, the portable player 13 executes a process according to the selection command as shown in FIG. 4 and shifts, for example, from the hierarchical menu mode 1 to the hierarchical menu mode 2. The mode setting section 501C of the portable player 13 also resets the counting of the 10-second timer and starts the counting of the 10-second timer from the beginning. Thus, the modes of the amplifier 11 and the portable player 13 are synchronized.

In the case where the mode is the reproducing menu mode (the reproducing menu in S16), the microcomputer processing section 601 transmits the selection command corresponding to the depressed selection key to the portable player 13 (S22). The mode setting section 601B resets the counting of the 5-second timer and starts the counting of the 5-second timer from the beginning (S23). On the other hand, when the selection command is received, the portable player 13 executes a process corresponding to the selection command as shown in FIG. 4 and shifts, for example, from the reproducing menu mode 1 to the reproducing menu mode 2. The mode setting section 501C in the portable player 13 also resets the counting of the 5-second timer and starts the counting of the 5-second timer from the beginning. Consequently, the modes of the amplifier 11 and the portable player 13 are synchronized.

Next, the microcomputer processing section 601 determines whether a cancellation key is depressed or not (S4). The cancellation key is a key for forcedly shifting the mode of the mode setting section 601B of the amplifier 11 from the hierarchical menu mode or the reproducing menu mode to the normal mode. Therefore, when the cancellation key is depressed (YES in S4), the mode setting section 601B shifts from the hierarchical menu mode or the reproducing menu mode to the normal mode. In the case where the synchronization of the mode of the amplifier 11 and that of the portable player 13 become asynchronous due to the transmission/reception time of a command from the amplifier 11 to the portable player 13 and process times in the mode setting sections 501C and 601B, by depression of the cancellation key by the user operation in the normal mode of the portable player 13, the mode of the amplifier 11 is forcedly shifted to the normal mode. Thus, the modes of the amplifier 11 and the portable player 13 can be synchronized.

Subsequently, the microcomputer processing section 601 determines whether reproducing start notification is received from the portable player 13 or not (S5). In the case where the reproducing start notification is received (YES in S5), the mode setting section 601B forcedly shifts from the hierarchical menu mode or the reproducing menu mode to the normal mode. When the selection command corresponding to the depression of the selection button is received in a state where, for example, a list of music piece data is displayed in the hierarchical menu mode, the portable player 13 selects music piece data on which the cursor is positioned in the music piece list and starts playing the selected music piece data. The mode setting section 501C shifts from the hierarchical menu mode to the normal mode, and the microcomputer processing section 501 transmits the reproducing start notification to the amplifier 11. Therefore, when the reproducing start notification is received, the mode setting section 601B of the amplifier 11 also shifts to the normal mode. As a result, the amplifier 11 and the portable player 13 simultaneously shift to the normal mode so that the modes can be synchronized.

Next, the microcomputer processing section 601 determines whether the counting of the 5-second timer or 10-second timer has finished or not (S6). When the counting of the timer is finished (YES in S6), the mode setting section 601B shifts from the hierarchical menu mode or the reproducing menu mode to the normal mode. For the above reasons, the counting of the timer of the portable player 13 is finished at the same timing, so that the portable player 13 also shifts to the normal mode at the same timing. As a result, the modes of the amplifier 11 and the portable player 13 can be synchronized.

As described above, in the embodiment, the amplifier 11 and the portable player 13 can be always set to the same mode. When the skip key of the system remote controller is depressed in the hierarchical menu mode or the reproducing menu mode, the amplifier 11 can convert the skip command to the cursor command and transmit the cursor command to the portable player 13. As a result, only by providing the skip key for the system remote controller, the skip command or the cursor command can be transmitted to the portable player 13 in accordance with the mode of the portable player 13.

Although the preferred embodiments of the present invention have been described above, the present invention is not limited to the embodiments. The command transmitting apparatus may be provided not in the amplifier 11 but in the charger of the portable player 13, or may be provided in a client apparatus which is connected to a server apparatus via a network, obtains content from the server apparatus, and plays the content. At the time of extending time of the hierarchical menu mode, extension time different from that of the aforementioned 10-second timer, for example, eight seconds may be set. The present invention is also applied to the case where only one of the hierarchical menu mode or the reproducing menu mode is provided. The keys are not limited to push-button switches but may be jog-dials or the like. The present invention can be also similarly applied to the case using video data or still picture data. The present invention can be also provided in the form of a computer program for making a computer execute the above-described operations.

The present invention can be preferably employed for an amplifier to which a portable player can be connected.

What is claimed is:

1. An amplifier apparatus connectable to a separate playing device and for transmitting a command to the separate playing device, the separate playing device having a normal mode and a menu mode, shifting from the normal mode to the menu mode in response to a first command and, after lapse of predetermined time by performing timer count since the shift to the menu mode, shifting to the normal mode, comprising:

an input section that has a first key and a second key, and does not have a third key for transmitting a third command for controlling the menu mode of the separate playing device to the separate playing device;

a mode setting section having a normal mode and a menu mode, shifting from the normal mode to the menu mode in response to an operation of the first key, and shifting from the menu mode to the normal mode after lapse of a predetermined time which is the same as a predetermined time set in the separate playing device for shifting from the menu mode to the normal mode by performing a timer count since the shift to the menu mode, thereby synchronizing the mode of the amplifier apparatus and the separate playing device;

a command transmitting section for transmitting the first command to the separate playing device in response to an operation on the first key; and a mode determining section for determining a mode set in the mode setting section when the second key is operated, wherein when it is determined that the mode setting section is in the normal mode, the command transmitting section transmits a second command for controlling the normal mode of the separate playing device to the separate playing device and, when it is determined that the mode setting section is in the menu mode, the command transmitting section transmits the third command to the separate playing device.

2. The amplifier apparatus according to claim 1, wherein when the separate playing device executes a predetermined process in response to the first command or the third command in the menu mode, the predetermined time until shift to the normal mode is extended, and when the first key or the second key is operated in the menu mode, the mode setting section extends the predetermined time until shift to the normal mode only by the same time as the extended time of the separate playing device.

3. The amplifier apparatus according to claim 1, wherein the input section further comprises a cancellation key, and when the cancellation key is operated, the mode setting section shifts from the menu mode to the normal mode irrespective of whether the predetermined time has elapsed or not.

4. The amplifier apparatus according to claim 1, wherein when reproducing of content starts, the separate playing device shifts from the menu mode to the normal mode, and transmits reproducing start notification to the amplifier apparatus, the amplifier apparatus further comprises a receiving section for receiving the reproducing start notification, and when the reproducing start notification is received, the mode setting section shifts from the menu mode to the normal mode irrespective of whether the predetermined time has elapsed or not.

5. The amplifier apparatus according to claim 1, wherein the second key is a skip key, the second command is a skip command for changing content selected by the separate playing device to forward/backward content, and the third command is a cursor command for moving a cursor on a menu screen of the separate playing device.

6. The amplifier apparatus according to claim 1, wherein the separate playing device is a portable player.

7. A non-transitory computer readable medium storing a computer program instructing a computer to perform an operation of an amplifier apparatus connectable to a separate playing device and for transmitting a command to the separate playing device, the separate playing device having a normal mode and a menu mode, shifting from the normal mode to the menu mode in response to a first command and, after lapse of predetermined time by performing timer count since the shift to the menu mode, shifting to the normal mode, the amplifier apparatus comprising an input section that has a first key and a second key, and does not have a third key for transmitting a third command for controlling the menu mode of the separate playing device to the separate playing device,
the computer program when executed instructs the computer to perform:
a mode setting step of shifting from the normal mode to the menu mode in response to an operation of the first key, and shifting from the menu mode to the normal mode after lapse of a predetermined time which is the same as a predetermined time set in the separate playing device for shifting from the menu mode to the normal mode by performing a timer count since the shift to the menu mode, thereby synchronizing the mode of the amplifier apparatus and the separate playing device;
a command transmitting step of transmitting the first command to the separate playing device in response to an operation on the first key; and
a mode determining step of determining a mode set in the mode setting step when the second key is operated,
wherein when it is determined that the mode setting step is in the normal mode, the command transmitting step transmits a second command for controlling the normal mode of the separate playing device to the separate playing device and,
when it is determined that the mode setting step is in the menu mode, the command transmitting step transmits the third command to the separate playing device.

8. The non-transitory computer readable medium according to claim 7, wherein when the separate playing device executes a predetermined process in response to the first command or the third command in the menu mode, the predetermined time until shift to the normal mode is extended, and
when the first key or the second key is operated in the menu mode, the mode setting step extends the predetermined time until shift to the normal mode only by the same time as the extended time of the separate playing device.

9. The non-transitory computer readable medium according to claim 7, wherein the input section further comprises a cancellation key, and
when the cancellation key is operated, the mode setting step shifts from the menu mode to the normal mode irrespective of whether the predetermined time has elapsed or not.

10. The non-transitory computer readable medium according to claim 7, wherein when reproducing of content starts, the separate playing device shifts from the menu mode to the normal mode, and transmits reproducing start notification to the amplifier apparatus,
the computer program instructs the computer to further perform a receiving step of receiving the reproducing start notification, and
when the reproducing start notification is received, the mode setting step shifts from the menu mode to the normal mode irrespective of whether the predetermined time has elapsed or not.

11. The non-transitory computer readable medium according to claim 7, wherein the second key is a skip key,
the second command is a skip command for changing content selected by the separate playing device to forward/backward content, and
the third command is a cursor command for moving a cursor on a menu screen of the separate playing device.

12. The non-transitory computer readable medium according to claim 7, wherein the separate playing device is a portable player.

* * * * *